(12) United States Patent
Foster

(10) Patent No.: US 11,040,698 B2
(45) Date of Patent: Jun. 22, 2021

(54) VEHICLE ALARM NOTIFICATION SYSTEM

(71) Applicant: Ronald Foster, Fountain Hill, PA (US)

(72) Inventor: Ronald Foster, Fountain Hill, PA (US)

(*) Notice: Subject to any disclaimer, the term of this patent is extended or adjusted under 35 U.S.C. 154(b) by 0 days.

(21) Appl. No.: 16/796,192

(22) Filed: Feb. 20, 2020

(65) Prior Publication Data

US 2020/0262389 A1 Aug. 20, 2020

Related U.S. Application Data

(60) Provisional application No. 62/808,044, filed on Feb. 20, 2019.

(51) Int. Cl.
*B60R 25/102* (2013.01)
*B60R 25/10* (2013.01)
*B60Q 5/00* (2006.01)
*B60Q 9/00* (2006.01)
*B60R 25/33* (2013.01)

(52) U.S. Cl.
CPC ............ *B60R 25/102* (2013.01); *B60Q 5/005* (2013.01); *B60Q 9/00* (2013.01); *B60R 25/1018* (2013.01); *B60R 25/33* (2013.01)

(58) Field of Classification Search
CPC ... B60R 25/102; B60R 25/1018; B60R 25/33; B60Q 5/005; B60Q 9/00
USPC .................................................. 340/426.19
See application file for complete search history.

(56) References Cited

U.S. PATENT DOCUMENTS

| | | | |
|---|---|---|---|
| 5,970,525 A | 10/1999 | Gallinot et al. | |
| 6,173,448 B1 | 1/2001 | Kroposky | |
| 6,205,593 B1 | 3/2001 | Schaub, Jr. | |
| 6,327,710 B1 | 12/2001 | Dunn et al. | |
| 6,909,964 B2* | 6/2005 | Armstrong | G01S 5/0072 340/5.64 |
| 8,847,731 B2* | 9/2014 | Tieman | B60R 25/24 340/5.62 |
| 2001/0002491 A1 | 6/2001 | Ehr | |
| 2004/0015117 A1 | 1/2004 | Gauthier | |
| 2014/0070929 A1* | 3/2014 | Myers | B60R 25/10 340/426.18 |
| 2014/0077961 A1* | 3/2014 | Frederick | G08B 21/02 340/686.6 |
| 2014/0139331 A1* | 5/2014 | Oliver | B60R 25/04 340/426.19 |

* cited by examiner

*Primary Examiner* — Kerri L McNally
(74) *Attorney, Agent, or Firm* — Boudwin Intellectual Property; Daniel Boudwin

(57) ABSTRACT

A vehicle alarm notification system including a housing having a plurality of directional indicia on a front side thereof. A wireless transceiver is operably connected to a power source disposed within the housing, wherein the transceiver can receive an alert signal from a vehicle alarm system when the vehicle alarm system is activated. A microprocessor is operably connected to the wireless transceiver. The microprocessor can determine a location of a vehicle, via an associated vehicle GPS, relative to a position of the housing. The microprocessor is further programmed to illuminate one of the plurality of directional indicia to indicate the location of the vehicle relative to the position of the housing when the alert signal is received. In some embodiments, a speaker is disposed within the housing, wherein the speaker can emit an audible alarm when the alert signal from a corresponding vehicle alarm system is received.

20 Claims, 2 Drawing Sheets

VEHICLE ALARM NOTIFICATION SYSTEM

CROSS REFERENCE TO RELATED APPLICATIONS

This application claims the benefit of U.S. Provisional Application No. 62/808,044 filed on Feb. 20, 2019. The above identified patent application is herein incorporated by reference in its entirety to provide continuity of disclosure.

BACKGROUND OF THE INVENTION

The present invention relates to a vehicle alarm notification system. More particularly, the present invention pertains to a vehicle alarm notification system having a housing with a plurality of directional indicia, such that a user is alerted to the location of an associated vehicle when the vehicle's alarm is activated.

Many individuals utilize vehicle alarms to determine when break-in attempts are made. However, the prevalence of such alarms has caused many to become desensitized to the sound of a blaring alarm. Additionally, many individuals may be a significant distance from their vehicle, or indoors, thereby preventing them from hearing the vehicle alarm at all. Without awareness of the activation of a vehicle alarm, the vehicle owner cannot readily interrupt or prevent a theft, often resulting in the criminal avoiding punishment for such a crime. Additionally, many individuals have difficulty locating their vehicles in crowded parking lots, even when a vehicle alarm is active. Therefore, a device that can simultaneously inform a user of the activation of their vehicle alarm, as well as guide the user to the location of the vehicle, is desired.

In light of the devices disclosed in the known art, it is submitted that the present invention substantially diverges in design elements from the known art and consequently it is clear that there is a need in the art for an improvement to existing vehicle alarm notification systems. In this regard, the instant invention substantially fulfills these needs.

SUMMARY OF THE INVENTION

In view of the foregoing disadvantages inherent in the known types of vehicle alarm notification systems now present in the known art, the present invention provides a vehicle alarm notification system wherein the same can be utilized for providing convenience for the user when ascertaining the location of an associated vehicle when the vehicle alarm is activated.

The present system comprises a housing having a plurality of directional indicia on a front side thereof. A wireless transceiver is operably connected to a power source disposed within the housing, wherein the wireless transceiver is configured to receive an alert signal from a vehicle alarm system when the vehicle alarm system is activated. A microprocessor is operably connected to the wireless transceiver, wherein the microprocessor is configured to determine a location of a vehicle via an associated vehicle GPS relative to a position of the housing. The microprocessor is configured to illuminate one of the plurality of directional indicia to indicate the location of the vehicle relative to the position of the housing when the alert signal is received. In some embodiments, a speaker is disposed within the housing, wherein the speaker is configured to emit an audible alarm corresponding to the vehicle alarm system when the alert signal is received. In this manner, the user is readily informed of the activation of the associated vehicle alarm system, as well as the relative location of the vehicle. In another embodiment, the housing further comprises an upper portion having an aperture therethrough, wherein the aperture is configured to receive a keychain therethrough.

In some embodiments, a plurality of light sources are configured to illuminate when the alert signal is received. In this way, the user is provided further visual notification of the activation of the vehicle alarm system. In another embodiment, the plurality of light sources are configured to illuminate intermittently, such as in a flashing pattern, when the alert signal is received, such that additional attention is drawn to the housing. In other embodiments, the plurality of light sources are disposed equiangularly about a center of the housing. In yet another embodiment, the plurality of light sources are disposed between adjacent directional indicia of the plurality of directional indicia. In some embodiments having a speaker, the plurality of light sources are configured to illuminate in a synchronous pattern relative to the audible alarm of the vehicle alarm system.

In some embodiments, an activation control is disposed on the housing, wherein the microprocessor is configured to illuminate one of the plurality of directional indicia to indicate the location of the vehicle relative to the position of the housing when the activation control is actuated. In other such embodiments, the activation control is disposed centrally between each of the plurality of directional indicia. In this manner, the user is provided with an alternate activation control, such that the user can selectively activate the plurality of directional indicia. In such embodiments, the vehicle alarm system need not be activated for a user to ascertain the location of the associated vehicle.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
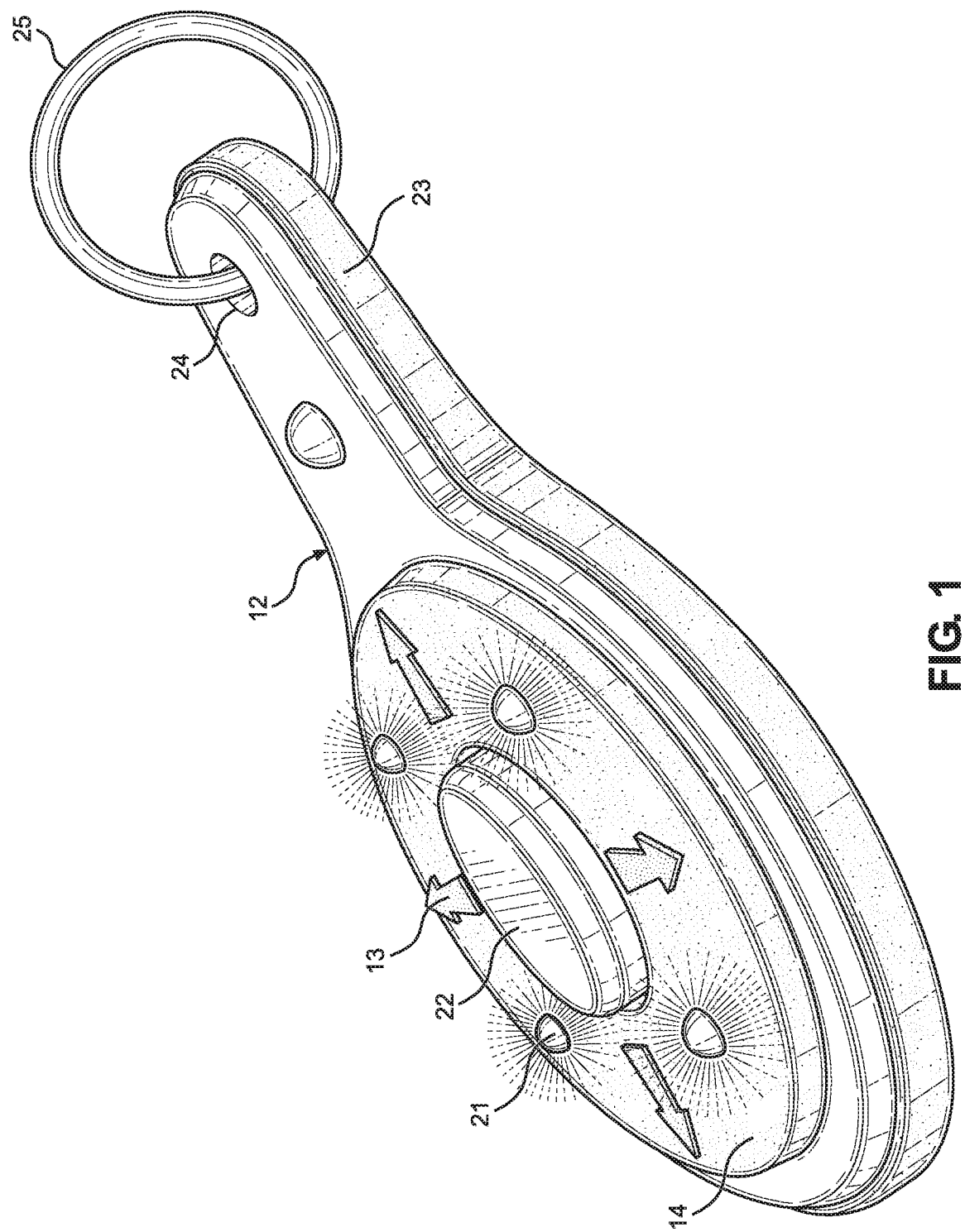
FIG. 1 shows a perspective view of an embodiment of the vehicle alarm notification system.

Reference is made herein to the attached drawings. Like reference numerals are used throughout the drawings to depict like or similar elements of the vehicle alarm notification system. The figures are intended for representative purposes only and should not be considered to be limiting in any respect.

Referring now to FIG. 1, there is shown a perspective view of an embodiment of the vehicle alarm notification system. The vehicle alarm notification system comprises a housing 12 having a variety of internal electrical components disposed therein, as further detailed below. In the shown embodiment, the housing 12 comprises a separate device utilized solely to perform the vehicle alarm notification functions described elsewhere herein. In alternate embodiments, the housing 12 can comprise a vehicle key fob. In this manner, the housing 12 can simultaneously perform the vehicle alarm notification functions in addition to those typically found on an existing key fob, such as unlocking a vehicle door, locking a vehicle door, initiating the engine of the vehicle, opening a trunk of the vehicle, activating the vehicle alarm, and the like. The housing 12 is contemplated to comprise a variety of materials capable of protectively encasing the variety of electronic components, such as durable plastics, metals, and the like.

The housing 12 further comprises a plurality of directional indicia 13 disposed on a front side 14 of the housing 12, wherein one or more of the plurality of directional indicia 13 are configured to illuminate when the vehicle alarm notification system receives an alert signal from an associated vehicle indicating that the vehicle alarm is activated. When the alert signal is received, the position of the housing 12 relative to that of the vehicle is determined, such that the directional indicia 13 indicating the direction of the vehicle is illuminated. In some embodiments, adjacent directional indicia 13 are illuminated when the relative direction of the vehicle is disposed between two adjacent directional indicia 13. In the illustrated embodiment, the plurality of directional indicia 13 comprise arrow shapes, however alternate forms of directional indicia 13 capable of indicating a particular direction are contemplated. Additionally, in the shown embodiment, the plurality of directional indicia 13 are disposed at regular intervals about a center of the housing 12, such as at 90-degrees, however alternate degrees of separation between the plurality of directional indicia 13 are contemplated. In some embodiments, the plurality of directional indicia 13 are configured to illuminate consistently in a solid pattern, however, in alternate embodiments, the plurality of directional indicia 13 are configured to intermittently illuminate in a flashing pattern. In this manner, the user is visually informed of the activation of the vehicle alarm system.

In the shown embodiment, a plurality of light sources 21 are disposed on the front side 14 of the housing 12. The plurality of light sources 21 are configured to illuminate when the vehicle alarm system is active, such that a user is given visual notification of the activation of the vehicle alarm. Similar to the plurality of directional indicia 13, the plurality of light sources 21 are configured to illuminate in a solid pattern, or in alternate embodiments, in an intermittent flashing pattern so as to provide additional visual interest to the housing 12. In the illustrated embodiment, the plurality of light sources 21 are disposed about a center of the housing 12 between each of the plurality of directional indicia 13. In some embodiments, the plurality of light sources 21 are disposed about the center of the housing 12 in an equiangular arrangement.

In the illustrated embodiment, an activation control 22 is disposed centrally on the front side 14 of the housing 12, wherein the activation control 22 is configured to selectively activate the plurality of directional indicia 13, such that the user can utilize the vehicle location determination functions of the vehicle alarm notification system without the vehicle alarm system being activated. In this manner, the user can activate the plurality of directional indicia 13 without requiring the vehicle alarm system to be activated, such as in situations where the user does not recall where the vehicle was parked. In the shown embodiment, each of the plurality of directional indicia 13 and the plurality of light sources 21 are disposed radially about the activation control 22. In this manner, the plurality of directional indicia 13 are oriented such that independent directions are indicated thereby for ease of orienting the housing 12 towards the location of the vehicle.

In the shown embodiment, the housing 12 further comprises an upper portion 23 having an aperture 24 therethrough. The upper portion 23 is configured to receive a keychain 25 through the aperture 24, such that the user can readily attach the housing 12 to an existing keyring or other support. In this manner, the housing 12 can be easily and readily transported. In the shown embodiment, the aperture 24 extends through the upper portion 23 from the front side 14 to a rear side thereof. In alternate embodiments, the aperture 24 can extend through opposing lateral sides of the upper portion 23.

Figure 2:
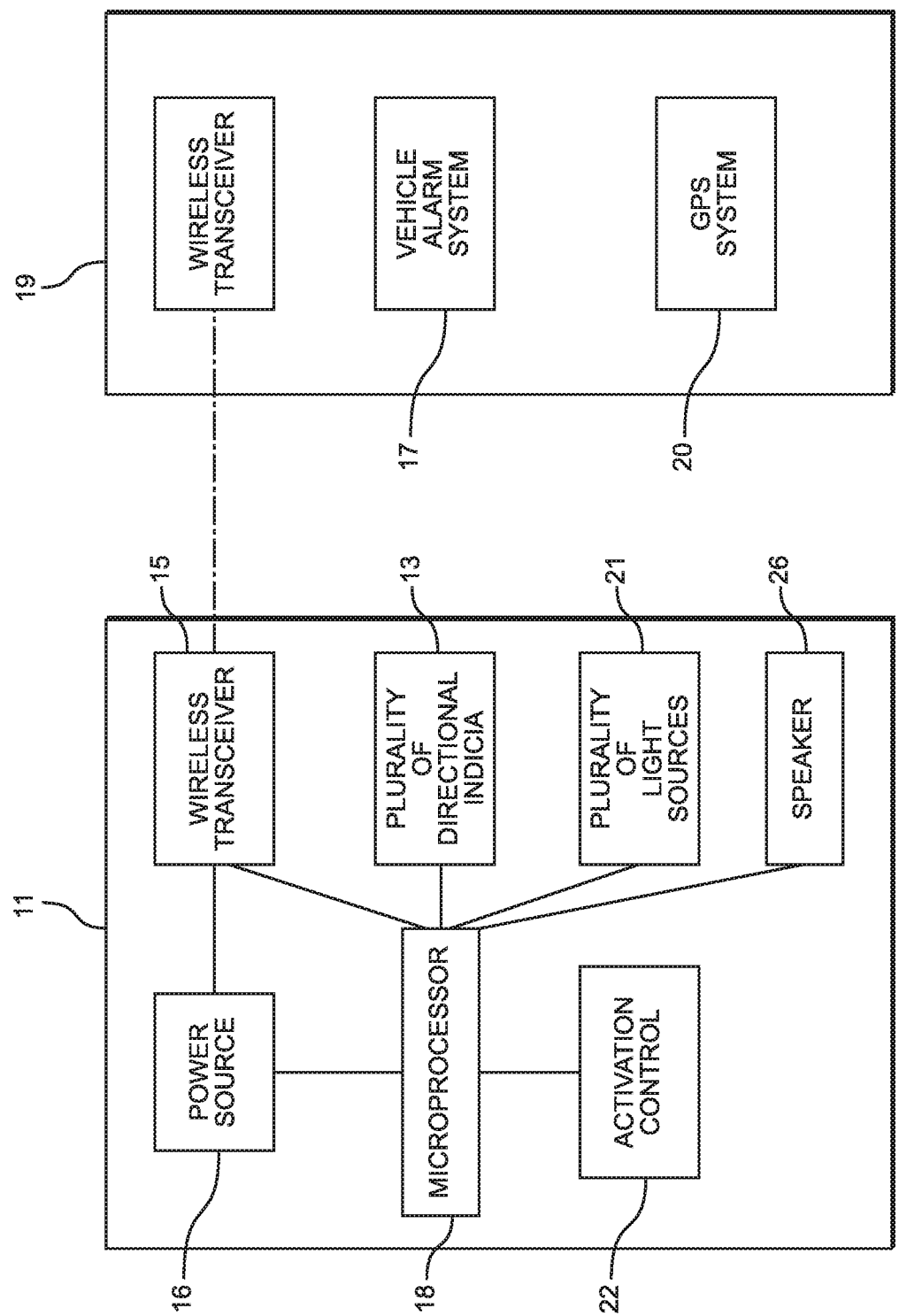
FIG. 2 shows a schematic view of an embodiment of the vehicle alarm notification system.

Referring now to FIG. 2, there is shown a schematic view of an embodiment of the vehicle alarm notification system. The vehicle alarm notification system 11 comprises the housing as previously described, wherein the housing includes a wireless transceiver 15 operably connected to a power source 16, wherein the wireless transceiver 15 is configured to wirelessly communicate with an associated vehicle 19. Upon activation of the vehicle alarm system 17, an alert signal is generated and sent to the vehicle alarm notification system 11. A microprocessor 18 is operably connected to the wireless transceiver 15, wherein the microprocessor 18 is configured to determine a location of the vehicle 19 relative to a position of the housing. The location of the vehicle 19 is presented in the alert signal via an on-board vehicle GPS system 20. Upon locating the relative position of the vehicle 19, the microprocessor 18 is configured to illuminate one or more of the plurality of directional indicia 13 to indicate the location of the vehicle 19 relative to the housing. Alternatively, if the user wishes to determine the location of the vehicle 19 without the vehicle alarm system 17 being activated, the activation control 22 is operably connected to the microprocessor 18 such that upon actuation of the activation control 22, the microprocessor 18 queries the vehicle GPS system 20 to determine the relative location of the vehicle 19. Upon determining the location of the vehicle 19, one or more of the plurality of directional indicia 13 illuminate to direct the user towards the location of the vehicle 19. In embodiments with the plurality of light sources 21, the microprocessor 18 is further configured to illuminate the plurality of light sources 21 when the alert signal is received.

In the illustrated embodiment, the vehicle alarm notification system 11 further comprises a speaker 26 disposed within the housing. The speaker 26 is configured to emit an audible alarm when the microprocessor 18 indicates that the alert signal is received, such that the user is informed of the activation of the vehicle alarm system 17 when the user is not otherwise within audible range of the vehicle 19. In some embodiments, the plurality of light sources 21 are configured to synchronously illuminate in time with the audible alarm emitted from the speaker 26. In some embodiments, the audible alarm comprises an alarm equivalent to the audible alarm emitted by the vehicle alarm system 17. In this manner, the audible alarm emitted by the speaker 26 is further associated with the user's vehicle, thereby increasing recognition that the vehicle alarm system 17 has been activated.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle alarm notification system, comprising:
   a housing having a plurality of directional indicia on a front side thereof;
   a wireless transceiver operably connected to a power source disposed within the housing;
   wherein the wireless transceiver is configured to receive an alert signal from a vehicle alarm system when the vehicle alarm system is activated;
   a microprocessor operably connected to the wireless transceiver, wherein the microprocessor is configured to determine a location of a vehicle, via an associated vehicle GPS, relative to a position of the housing;
   wherein the microprocessor is configured to illuminate at least one of the plurality of directional indicia to indicate the location of the vehicle relative to the position of the housing when the alert signal is received;
   wherein the microprocessor is configured to simultaneously illuminate a pair of adjacent directional indicia when the relative direction of the vehicle is determined to be between the pair of adjacent directional indicia.

2. The vehicle alarm notification system of claim 1, further comprising a plurality of light sources disposed on the front side of the housing, wherein the plurality of light sources are configured to illuminate independently from the plurality of directional indicia when the alert signal is received.

3. The vehicle alarm notification system of claim 2, wherein the plurality of light sources are disposed equidistantly about a center of the housing.

4. The vehicle alarm notification system of claim 2, wherein the plurality of light sources are disposed between adjacent directional indicia of the plurality of directional indicia.

5. The vehicle alarm notification system of claim 2, wherein the plurality of light sources are configured to illuminate intermittently when the alert signal is received.

6. The vehicle alarm notification system of claim 1, further comprising an activation control, wherein the microprocessor is configured to illuminate at least one of the plurality of directional indicia to indicate the location of the vehicle relative to the position of the housing when the activation control is actuated.

7. The vehicle alarm notification system of claim 6, wherein the activation control is disposed centrally between each of the plurality of directional indicia.

8. The vehicle alarm notification system of claim 1, wherein the upper portion of the housing comprises an aperture therethrough, the aperture configured to receive a keychain therethrough.

9. A vehicle alarm notification system, comprising:
   a housing having a plurality of directional indicia on a front side thereof;
   a wireless transceiver operably connected to a power source disposed within the housing;
   wherein the wireless transceiver is configured to receive an alert signal from a vehicle alarm system when the vehicle alarm system is activated;
   a speaker disposed within the housing, wherein the speaker is configured to emit an audible alarm corresponding to the vehicle alarm system when the alert signal is received;
   a microprocessor operably connected to the wireless transceiver, wherein the microprocessor is configured to determine a location of a vehicle via an associated vehicle GPS relative to a position of the housing;
   wherein the microprocessor is configured to illuminate at least one of the plurality of directional indicia to indicate the location of the vehicle relative to the position of the housing when the alert signal is received;
   wherein the microprocessor is configured to simultaneously illuminate a pair of adjacent directional indicia when the relative direction of the vehicle is determined to be between the pair of adjacent directional indicia.

10. The vehicle alarm notification system of claim 9, further comprising a plurality of light sources disposed on the front side of the housing, wherein the plurality of light sources are configured to illuminate independently from the plurality of directional indicia when the alert signal is received.

11. The vehicle alarm notification system of claim 10, wherein the plurality of light sources are disposed equiangularly about a center of the housing.

12. The vehicle alarm notification system of claim 10, wherein the plurality of light sources are disposed between adjacent directional indicia of the plurality of directional indicia.

13. The vehicle alarm notification system of claim 10, wherein the plurality of light sources are configured to illuminate intermittently when the alert signal is received.

14. The vehicle alarm notification system of claim 9, further comprising an activation control, wherein the microprocessor is configured to illuminate at least one of the plurality of directional indicia to indicate the location of the vehicle relative to the position of the housing when the activation control is actuated.

15. The vehicle alarm notification system of claim 14, wherein the activation control is disposed centrally between each of the plurality of directional indicia.

16. The vehicle alarm notification system of claim 9, wherein the upper portion of the housing comprises an aperture therethrough, the aperture configured to receive a keychain therethrough.

17. The vehicle alarm notification system of claim 10, wherein the plurality of light sources are configured to illuminate in a synchronous pattern relative to the audible alarm of the vehicle alarm system.

18. The vehicle alarm notification system of claim 1, wherein the plurality of directional indicia are configured to illuminate intermittently in a flashing pattern.

19. The vehicle alarm notification system of claim 9, wherein the plurality of directional indicia are configured to illuminate intermittently in a flashing pattern.

20. The vehicle alarm notification system of claim 9, wherein the audible alarm comprises an alarm equivalent to an alarm emitted by the vehicle alarm system.

* * * * *